W. D. VERSCHOYLE.
PORTABLE HAND DRIVEN TURNING LATHE.
APPLICATION FILED APR. 17, 1909.

968,295.

Patented Aug. 23, 1910.
2 SHEETS—SHEET 1.

WITNESSES
B. Rollhaus
J. P. Davis

INVENTOR
William Denham Verschoyle
BY
Munn & Co.
ATTORNEYS

W. D. VERSCHOYLE.
PORTABLE HAND DRIVEN TURNING LATHE.
APPLICATION FILED APR. 17, 1909.
968,295.
Patented Aug. 23, 1910.
2 SHEETS—SHEET 2.
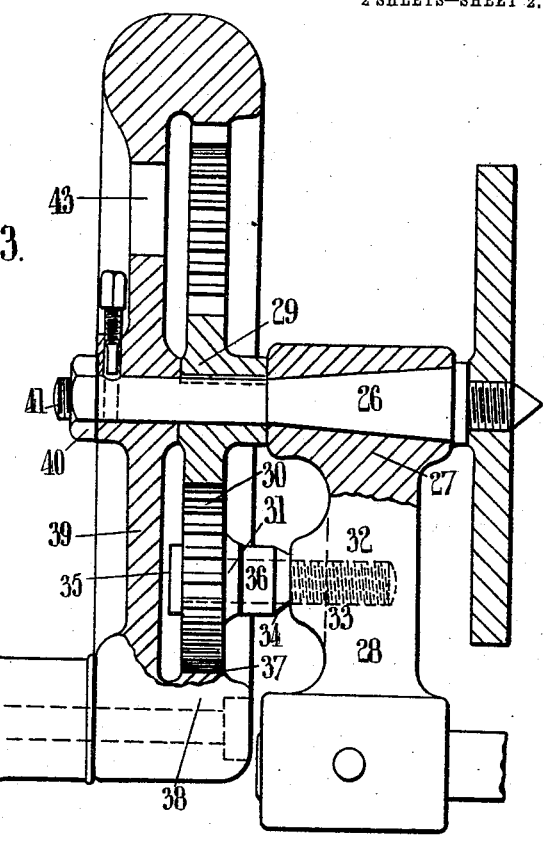
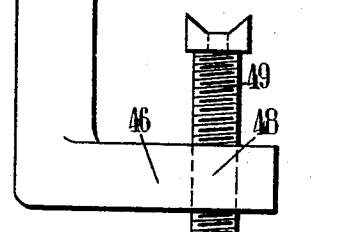
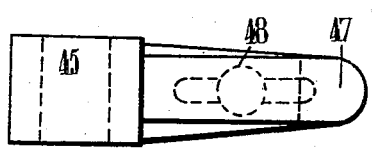
WITNESSES
INVENTOR
William Denham Verschoyle
BY
ATTORNEYS

UNITED STATES PATENT OFFICE.

WILLIAM DENHAM VERSCHOYLE, OF TANRAGO, BALLYSADARE, IRELAND.

PORTABLE HAND-DRIVEN TURNING-LATHE.

968,295.  Specification of Letters Patent.  Patented Aug. 23, 1910.

Application filed April 17, 1909. Serial No. 490,513.

*To all whom it may concern:*

Be it known that I, WILLIAM DENHAM VERSCHOYLE, a subject of the King of Great Britain, and resident of Tanrago, Ballysadare, in the county of Sligo, Ireland, mining engineer, have invented certain new and useful Improvements Relating to Portable Hand-Driven Turning-Lathes, of which the following is a specification.
This invention relates to portable hand-driven turning lathes and consists in improvements in, or modification of, the invention for which Letters Patent of the United States of America, No. 918,227 and dated April 13, 1909 were granted to me.

The object of the present invention is to provide means in a portable hand-driven turning lathe, of the kind wherein the bed is constituted by a bar attached to an upright whose lower portion is fitted to turn in, and adapted to be fixed to a socket forming part of a clamp whereby the entire lathe may be secured to a table or other extraneous support, for increasing the speed of, and for varying the power transmitted to, the driving spindle.

One form of this invention consists in the attachment of a spur wheel to the outer extremity of the driving spindle, said spur wheel being driven by engaging the teeth of a larger driving wheel provided with an adjustable radius crank-handle whereby the driving wheel may be rotated on a stationary spindle attached to the upright member forming the headstock of the lathe.

In a modified form the spur wheel attached to the lathe driving spindle, is driven by engaging the teeth of a change wheel, rotatably mounted on a stationary spindle attached to the headstock of the lathe, the change wheel being driven by engaging the teeth of a driving wheel rotatably mounted on the outer extremity of the lathe driving spindle, and providing means whereby the change wheel may be withdrawn and the rotation of the driving spindle obtained by securing the driving wheel to said driving spindle.

Figure 1:
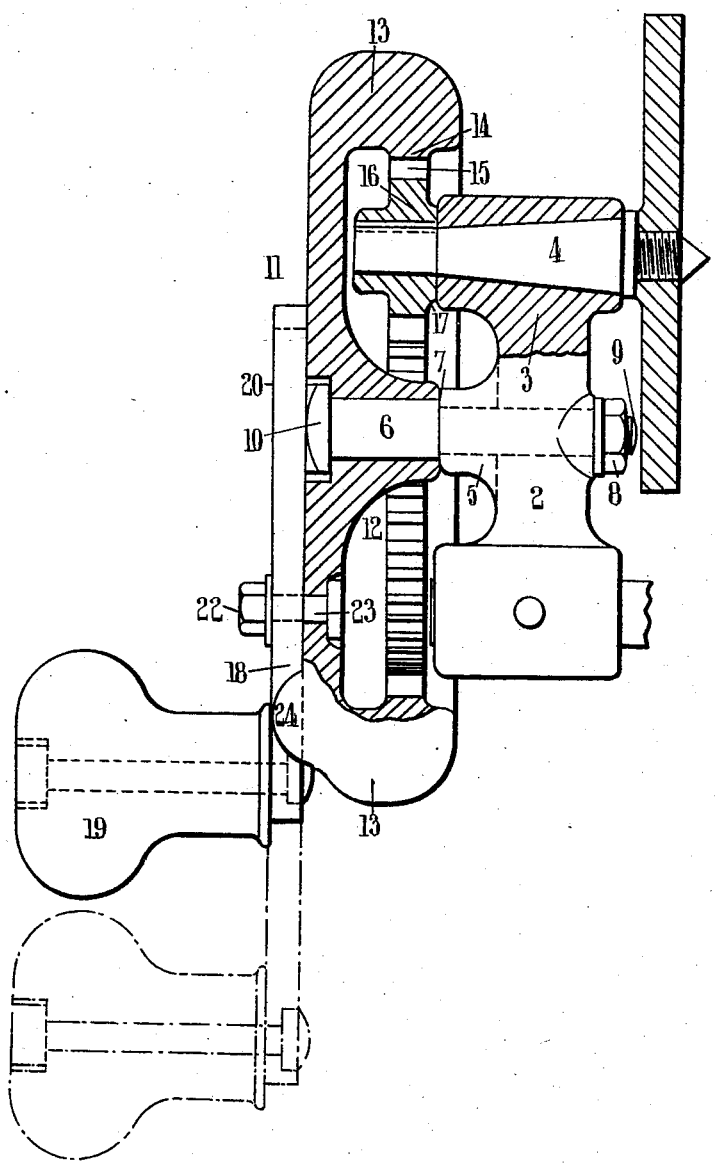
Figure 2:
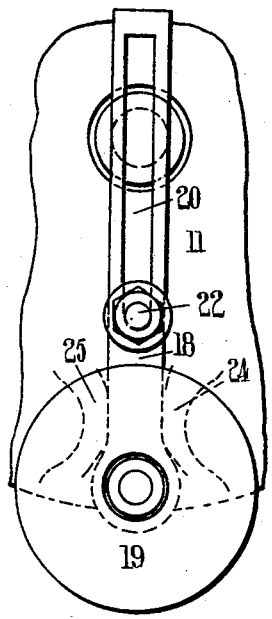

In the accompanying drawings Figure 1 is a front elevation of the lathe, parts being shown in section. Fig. 2 is a face view of a section of the driving wheel. Fig. 3 is a front elevation, parts being shown in section, of the modified form. Fig. 4 is a front elevation of the clamp, parts being in section. Fig. 5 is a plan view of the clamp.

Referring to Fig. 1, the upright member 2 forming the headstock of the lathe and the bearing 3 for the driving spindle 4, carries a boss web or the like to form a bearing 5 for the stationary spindle 6. The spindle 6 has a shoulder 7 adapted to engage against the outer end of the bearing 5, said spindle being held securely in position by means of a nut 8 screwing on the threaded end 9 passing through the bearing 5. The outside end of the spindle 6 carries a head 10 for the purpose of retaining a driving wheel in position on the stationary spindle 6. The driving wheel 11 carries at its center a boss 12 forming the bearing on the spindle 6, the rim 13 of the driving wheel being preferably weighted to impart regular motion and give momentum to the rotating parts, carries internal teeth as at 14 engaging the external teeth 15 of the spur gear wheel 16, said wheel being secured to the driving spindle 4 by means of a screw or other locking device. The gear wheel 16 carries on its inner side a distance flange 17 preventing lateral motion of the spindle and contact between the gear wheel and the driving spindle bearing.

Referring to Figs. 1 and 2, the rotation of the driving wheel 11 is effected by means of an adjustable radius crank arm 18 provided at its outer end with a rotatable handle 19, said arm being provided with a longitudinal slot 20 whereby the length of the crank lever may be adjusted, thereby increasing or reducing the power transmitted by the rotatable handle 19, the speed being constant. The crank lever is secured in radial position by means of a nut 22 and bolt 23 passing through the side of the driving wheel and engaging the longitudinal slot 20, and is radially guided by two stops 24, 25 provided near the periphery of the wheel.

In a modified form as shown in Fig. 3, the lathe driving spindle 26 rotatably mounted in the bearing 27 forming part of the headstock of the lathe 28 carries a spur wheel 29 securely fixed thereon by means of a screw or other locking device. The spur wheel is driven by engaging the teeth of a change wheel 30 rotatably mounted on a stationary spindle 31, the threaded end 32 of which screws into a box web or the like 33 forming part of the headstock of the lathe. The stationary spindle 31 carries a shoulder 34 adapted to engage against the outer end of the boss 33. A change wheel is kept in axial alinement with the spur wheel by means of a head 35 formed on the outer end of the stationary spindle, and of a removable distance piece 36 placed between the spur wheel and the shoulder 34. The change wheel 30 is driven by engaging teeth 37 placed on the inside rim 38 of a driving wheel 39, rotatably mounted on the extremity of the driving spindle 26. A nut 40 screws on the threaded end 41 of the driving spindle for the purpose of retaining the driving wheel in parallel axial alinement with the spur and change wheels. The driving wheel is provided with a rotatable handle 42 whereby rotary motion may be imparted.

When speed is not necessary, increased power may be transmitted to the driving spindle by locking the driving wheel 39 on the spindle 26 by means of a screw or other locking device and by taking the change wheel 30 out of axial alinement with the spur wheel 29 by inserting the removable distance piece 36 between the head 35 and the spur wheel 30 through an opening 43 provided in the side of the driving wheel.

In some cases, if desired, the bed bar may be provided, at the puppet head end, with a detachable clamp for the purpose of steadying and securing it to the table or other support. The clamp, as shown in Figs. 4 and 5, comprises an upright member 44 adapted to engage and be secured to the bed bar 45, said member carrying two arms 46 and 47 integral with and projecting from the upright member 44, the lower arm 46 having a threaded hole 48 through which works a clamping thrust screw 49 parallel to the axis of the upright member.

Claims:

1. A portable hand driven turning lathe comprising a bar constituting a bed, a clamp detachably secured to the puppet end of said bed bar for securing the lathe to an extraneous support, an upright secured to said bar, a driving spindle journaled in the upright, an internally toothed driving wheel mounted on the upright and provided with a crank handle for operating it, and means for operating the spindle from the said driving wheel.

2. A portable hand-driven turning lathe, comprising an upright, means for securing the upright to a support, a driving spindle mounted in the upright, a pinion on the spindle, an internally toothed driving wheel on the spindle and provided with a crank handle, and a pinion mounted on the upright and meshing with the first named pinion and the driving wheel.

3. A portable hand-driven turning lathe, comprising an upright, means for securing the upright to a support, a driving spindle mounted in the upright, a pinion on the spindle, an internally toothed driving wheel mounted on the said spindle, means for locking the wheel to the spindle, a pinion mounted on the upright and meshing with the first named pinion and the driving wheel, and means whereby the pinion may be moved out of gear with the said pinion and wheel.

4. A portable hand-driven turning lathe, comprising an upright, means for securing the upright to a support, a driving spindle mounted in the upright, a pinion on the spindle, an internally toothed driving wheel mounted on the spindle, means for locking the wheel to the spindle, a stationary spindle movably mounted in the upright and provided with a head at its outer end and a shoulder intermediate of its ends, a pinion mounted on said spindle between the head and shoulder, and a removable distance piece on said spindle.

WILLIAM DENHAM VERSCHOYLE.

Witnesses:
GEORGE E. MINTEDU,
FRANK C. RYDE.